United States Patent [19]

Kinney, Jr. et al.

[11] Patent Number: 4,839,049

[45] Date of Patent: Jun. 13, 1989

[54] CERAMIC COMPOSITION

[75] Inventors: John W. Kinney, Jr., New Richmond; John W. Graham, Cincinnati, both of Ohio

[73] Assignee: Astro Met Associates, Inc., Cincinnati, Ohio

[21] Appl. No.: 198,449

[22] Filed: May 19, 1988

Related U.S. Application Data

[60] Division of Ser. No. 794,956, Nov. 4, 1985, Pat. No. 4,760,038, which is a continuation of Ser. No. 528,737, Sep. 1, 1983, abandoned.

[51] Int. Cl.$^4$ .............................................. B01D 39/20
[52] U.S. Cl. ................................................... 210/510.1
[58] Field of Search ................. 501/81, 82, 105, 127, 501/153, 95, 128; 210/510.1, 502.1

[56] References Cited

U.S. PATENT DOCUMENTS

| | | | |
|---|---|---|---|
| 1,856,475 | 5/1932 | Frost | 428/464 |
| 2,751,289 | 6/1956 | Elliott | 75/20 |
| 2,842,447 | 7/1958 | Schlotzhauer | 501/105 |
| 2,863,558 | 12/1985 | Brondyke et al. | 210/510.1 |
| 2,905,564 | 9/1959 | Roup | 501/105 |
| 3,006,473 | 10/1961 | Gamber | 210/510.1 |
| 3,090,094 | 5/1963 | Schwartzwalder et al. | 264/44 |
| 3,097,930 | 7/1963 | Holland | 264/44 |
| 3,157,523 | 11/1964 | Bayer | 210/510.1 |
| 3,214,265 | 10/1965 | Fiedler | 75/20 |
| 3,526,485 | 9/1970 | Dawihl | 501/127 |
| 3,597,247 | 8/1981 | Reardon | 501/127 |
| 3,747,765 | 7/1973 | Nowak | 210/238 |
| 3,893,917 | 7/1975 | Pryor et al. | 210/510.1 |
| 3,898,917 | 8/1975 | Adams et al. | 91/488 |
| 3,947,363 | 3/1976 | Pryor et al. | 210/510.1 |
| 3,962,081 | 6/1976 | Yarwood et al. | 210/510.1 |
| 4,058,485 | 11/1977 | Cheung | 252/463 |
| 4,211,624 | 7/1980 | Semkima | 501/105 |
| 4,308,067 | 12/1981 | Guigounis | 501/105 |
| 4,314,827 | 2/1982 | Leitheiser | 501/105 |
| 4,342,664 | 8/1982 | Blome | 501/127 |
| 4,343,704 | 8/1982 | Brockmeyer | 210/510.1 |
| 4,391,918 | 7/1983 | Brockmeyer | 501/127 |
| 4,415,673 | 11/1983 | Feagin | 501/105 |

FOREIGN PATENT DOCUMENTS

| | | | |
|---|---|---|---|
| 2005031 | 12/1969 | France | 501/105 |
| 131643 | 7/1978 | German Democratic Rep. | 501/82 |
| 1388912 | 3/1975 | United Kingdom | 501/105 |
| 2008621 | 6/1979 | United Kingdom | 501/105 |
| 2027688 | 2/1980 | United Kingdom | 501/82 |

OTHER PUBLICATIONS

American Ceramic Society Bulletin, Mar. 1982, vol. 61, No. 3, pp. 339 and 440.

*Primary Examiner*—Ernest G. Therkorn
*Attorney, Agent, or Firm*—Wood, Herron & Evans

[57] ABSTRACT

An improved thermal shock resistant and generally thermal resistant ceramic composition is disclosed. The ceramic composition is compounded of aluminum oxide as a primary constituent with additives in a preferred form comprising zirconium oxide plus manganese oxide or titanium oxide, or both, interacted by exposure to high temperature. The additives increase the thermal shock resistance of the fired ceramic composition, with retention of elevated temperature strength properties. The ceramic compositions are prepared as high density solid shapes or as porous structures. The solid shapes formed into machine components show improved resistance to rapid thermal excursions, differential thermal gradients and elevated temperatures. Open cell ceramic foams of the ceramic composition are useful for hot filters, such as for filtering molten metal as well as in reaction supporting applications, where such ceramic foam structures are subject to rapid temperature and pressure transients.

5 Claims, No Drawings

ND. 4,839,049

CERAMIC COMPOSITION

This is a division of application Ser. No. 794,956, filed Nov. 4, 1985, now U.S. Pat. No. 4,760,038 which was a continuation of Ser. No. 528,737 filed Sept. 1, 1983, now abandoned.

FIELD OF THE INVENTION

This invention generally relates to fired ceramic compositions, and particularly to fired ceramic compositions which are resistant to thermal transients and capable of withstanding high temperatures, and more particularly to fired porous ceramics useful for the filtering of molten metals, for combustion radiant heaters, for catalyst supports, for combustion filters, and generally for use at elevated temperatures.

BACKGROUND OF THE INVENTION

Porous ceramics, such as are produced by the replication process, are well known in the art. The replication process has been utilized widely. In its more basic form, replication of pores or holes includes the preparation of lightweight ceramic blanks molded with a combustible or volatile constituent material, for example. When fired at high temperatures, the combustibles burn away, leaving pores of the same shape in the surrounding ceramic. Such a replication technique has found particular application where porous ceramic, metal, fibrous and polymeric replicates are prepared for filtering chemicals, water, hydrocarbons, gases, and the like.

In filtering technology, it is known to coat organic structures, such as polyurethane foams, with a ceramic composition, as disclosed in U.S. Pat. Nos. 1,856,475, 3,214,265, 3,090,094 and by 3,097,930, for example.

U.S. Pat. No. 3,090,094 discloses the use of silicate and phosphate binders to aid in supporting the refractory ceramic particles in order to prevent the unsintered ceramic from collapsing during the organic burnout phase of the process. The examples disclose that such ceramics were fired to temperatures between 2100°–2500° F. It is well known to those familiar with the state of the art that such low process temperatures suggest that such compositions are less refractory than those requiring higher maturing temperatures.

U.S. Pat. No. 3,097,930 shows aluminum oxide (alumina), beryllium oxide (beryllia) and china clay as specific major ingredients of three separate porous ceramic structures. The porous alumina ceramic as taught by Example I of this patent is expected to be resistant to high temperatures, moderate in cost, but not thermal shock resistant. The porous beryllia ceramic as taught by Example II is also expected to be resistant to elevated temperatures, but very expensive due to the inherent cost of beryllium oxide. The porous china clay ceramic as taught by Example III has a low firing temperature of about 1350° C., and consequently has a relatively low temperature resistance.

U.S. Pat. No. 3,898,917 discloses the preparation and application of such ceramic foam structures for filtering molten metal—particularly molten aluminum alloys, and copper and its alloys—where the melts are generally below 2000° F.

U.S. Pat. No. 3,947,363 describes a ceramic composition containing aluminum oxide with chromium oxide, bentonite and a ceramic binder, preferably aluminum orthophosphate. The '363 patent discloses that other air setting binders can be used, but aluminum orthophosphate is preferred. This binder contributes to the softening of the resulting fired ceramic foams beginning at 2000° F. or so. The inclusion of bentonite contributes silica, which along with the other constituents, results in a glassy phase that is subject to softening at temperatures beginning as low as about 1600° F., depending upon the composition.

High purity aluminum oxide ceramic foams have been produced for filtering molten high temperature cobalt and nickel alloys containing hafnium as a minor ingredient. Such high purity filters are necessary since hafnium reacts with silica, phosphorus and boron, which may be present in less pure refractories, to thereby contaminate the resulting normally pure alloy casting. Other alloy ingredients, such as titanium, chromium and the like, also react with trace amounts of other minor elements such as may be found in impure refractories which may be contacted by such molten alloys, such as tundishes, pouring spouts, filters etc. The filtering of such alloys in particular requires ceramic filters in which contaminating or contaminate producing minor elements are eliminated or present only in specified limited amounts.

These ceramic foams are therefore limited due to their low resistance to softening at temperatures of about 2000° F. or less. Ceramic foams prepared with phosphate compounds form glassy phases which soften as they become heated above red heat. The addition of phosphates, borates and silicates to more refractory compounds are known to contribute to the formation of glassy phases which tend to become plastic as such products are exposed to high temperatures.

The filtering of cobalt and nickel high temperature alloys, as well as other less refractory alloys, often requires that the ceramic filters be highly resistant to thermal stress. This is in order that the molten alloys being cast at temperatures exceeding 2500° F. do not cause the ceramic filters to shatter, and thereby contribute small ceramic particles to the resulting castings. Such contaminating ceramic particles are known to cause defects which lower the fatigue and stress resistance of the alloys in their intended application.

It is known that ceramics are more brittle than most metal and plastic materials. This is due to the inherent inability of ceramic materials to resist significant deflection, i.e., strain. Ceramists have discovered that solid ceramics can withstand more thermal strain when the major ceramic crystal grains include a great number of even smaller crystal grains of a second phase, such as other ceramic compounds. For example, fired dense aluminum oxide solids which contain many discrete fine particles of zirconium oxide are known to be more tough and thermal shock resistant than the same material without such scattered particles within the grain structure. The discrete zirconium oxide particles act as "crack stoppers", and inhibit the propagation of cracks in the principal aluminum oxide grains to short localized areas. This phenomenon was addressed by R. L. Cox in "Temperature Dependence of Transformation Toughening in Alumina-Zirconia Ceramics", on May 5, 1982, at the annual meeting of the American Ceramic Society.

Another reported mechanism for increasing the resistance of brittle ceramics to strain failure is by increasing ductility through diffusional creep. This phenomenon was addressed by Y. Ikumo and R. S. Gordon in "Diffusional Creep of Polycrystalline Alumina Doped with Manganese-Titanium and Iron-Titanium Impurity Pairs", presented on May 5, 1982, at the annual meeting of the American Ceramic Society There is a need in the industry for an inexpensive fired ceramic composition which has little or no glassy phase at temperatures in excess of 2000° F., which includes few or no potentially melt contaminating minor ingredients and which, in particular, has an exceptional shock resistance.

It is therefore an object of this invention to provide an improved fired ceramic composition with high temperature resistance.

It is another object of this invention to provide a fired ceramic composition with improved thermal shock resistance.

It is a further object of this invention to provide shock resistant refractory ceramic structures with little or no glassy phase.

It is yet another object of this invention to provide a ceramic foam, such as for use as a filter, which has improved high temperature resistance and is resistant to degradation under severe conditions of use, such as in the filtering of molten metal.

It is a principal object of this invention to provide a ceramic foam which has improved resistance to thermal shock.

A further object of this invention is to provide such a ceramic foam with high compressive strength and with relatively low pressure drops.

Yet another object is to provide an improved ceramic foam filter useful for filtering aluminum and other low melting point alloys at temperatures upward of about 1000° F., but particularly useful for filtering metals and alloys at molten metal temperatures above about 2500° F.

It is a further object of the invention to provide a fired ceramic composition that can be exposed to rapid temperature changes while resisting fracture due to thermal stress.

It is still another object to produce such fired ceramic compositions and foams with the use of relatively inexpensive ingredients, and which are substantially nonreactive to molten metal alloys.

SUMMARY OF THE INVENTION

These and other objects have been accomplished in this invention in an improved ceramic composition particularly useful in the production of ceramic solids and ceramic foams having enhanced thermal shock resistance and resistance to high temperature degradation. The invention is in a ceramic composition comprised of aluminum oxide as a principal ingredient with controlled additives of one or more of zirconium, titanium, and manganese oxides. Compositions according to the present invention include $Al_2O_3$ with an additive of one, or preferably more, of $ZrO_2$, $TiO_2$, or $MnO_2$ as a fired ceramic material, and particularly as a fired ceramic foam.

The invention is particularly directed to a ceramic composition comprised of $Al_2O_3$ as a principal ingredient with $ZrO_2$ and $TiO_2$, or $ZrO_2$ and $MnO_2$ dispersed throughout as additives. In one preferred form, the composition is comprised of $Al_2O_3$ as a principal ingredient with $ZrO_2$, $TiO_2$ and $MnO_2$ as additives. Fibrous aluminum silicate has also been advantageously included as a minor additive in the ceramic composition of this invention to increase the structural strength of the ceramic structures, such as shaped high density solid components and ceramic foams. Ceramic structures prepared from ceramic bodies containing fibrous aluminum silicate are more readily converted into large fired shapes with less cracking, and exhibit slightly greater thermal shock resistance than such structures prepared without the fibrous aluminum silicate.

In general, the ceramic composition of this invention broadly contemplates a mixture of about 40-99.5% dry ceramic weight of alumina, with additive ingredients of one or more of up to about 60% zirconia, up to about 5% titania and up to about 5% manganese oxide as a fired foam ceramic. More particularly, the ceramic composition contemplates about 40-99.5% alumina with additives of up to about 60% zirconia, and one or both of minor additives of up to about 5% (alone or combined) of titania and manganese oxide for fired ceramic solid shapes or foams; up to about 5% fibrous aluminum silicate is an additional additive to the composition for improved structural strength, particularly in fired ceramic foams made with the composition. A presently preferred composition of this invention contemplates about 60-99.5% alumina, with about 5-35% zirconia and from about 0.25-0.5% titania or manganese oxide, or 0.25-5% combined weight of titania and manganese oxide, and about 1.4-% 4.3% fibrous aluminum silicate. When such compositions in the form of intimately mixed and closely packed powders are gradually heated to temperatures of between about 2750°-3000° F. for one to two hours, the powders sinter together to form a ceramic structure, such as a solid high density shape or ceramic foam, for example.

The controlled oxide additives increase the ability of the fired aluminum oxide base ceramic to yield to sudden heat gradients with lower stress, i.e. with resulting increased thermal shock resistance. When paint-like particle slurries of such ceramic compositions are impregnated into polymeric or other organic fibrous or open cellular structures as a filmlike coating covering the fibrous or cellular webs, and then dried and fired to temperatures above about 2750° F., the resulting product is a lightweight relatively porous ceramic foam with improved resistance to both thermal shock and thermal degradation at high temperatures.

These fired ceramic foams have been found useful for high temperature applications which may be subject to thermal shock. For instance, foams made from the ceramic composition of this invention have been found to be able to withstand sudden heating from room temperatures to the temperature of a molten metal, such as results when molten metals are passed through the filter without any preheating of the fired ceramic. In general, the structures made from this ceramic composition are useful for highly efficient filters for molten metals at temperatures from near 1000° to above about 2750° F., for high temperature catalyst supports, and for radiating combustion surfaces, to name a few applications.

The fired ceramic solid bodies of aluminum oxide with additives of zirconium oxide and titanium oxide and/or manganese oxide are more thermal shock-resistant, combined with a general resistance to high temperatures. The solid ceramic components are strong, dense, and being fully oxidized, exhibit high temperature properties desirable in certain ceramic machine components, and refractory applications, such as in melting metals as pouring spouts, tundishes, boiler tube protectors and the like.

The fired solids and foams made from the ceramic composition of this invention are not prepared with phosphate, hydrated cements, bentonite, china clay, kaolins, and other mineral binders. No silicates are used, except where fibrous aluminum silicate is included as a structural material. The resulting ceramic structures made from the composition of this invention thus contain little or no glassy phase such as would soften the fired ceramic structure when exposed to high temperatures. The instant composition contains very chemically stable and metallurgically compatible ingredients known to be acceptable in the melting and casting of molten metals. Most significantly, the ceramic foam filters prepared of the composition of this invention permit many molten metals to be poured directly on the unheated ceramic foam with little or no cracking of the foam, permitting such metals to be filtered with little or no contamination of the casting.

DETAILED DESCRIPTION

A presently preferred aluminum oxide (alumina) forming the major ingredient of the ceramic composition of this invention is commercially available from Aluminum Corporation of America and Reynolds Corporation, for example. The alumina should be selected from grades identified as low sodium grades, and being greater than 99% pure. These alumina materials preferably are provided as ball-milled powders with average particle size below about 42 microns. The composition of this invention may contain from one to several aluminas, but preferably contains mixtures of two or three aluminas. These aluminas may have particle sizes ranging up to about 42 microns, but preferably fall in the range of 3 micron particle size average or less for use herein.

The initial particle size ranges can vary in part or in whole from that preferred, provided the subsequent mixture is comminuted, as by high energy methods, such as by ballmilling sufficient to create average particle sizes in the preferred range of 3 microns or less. As calculated from the raw material batch, the major alumina ingredients are preferably generally limited to about 60–99.4% by weight of the dry composition, with additive ceramic ingredients of about 5–35% zirconia and minor additives of titanium and/or manganese oxides limited to between 0.25–0.5% (along or combined) of the total dry ceramic weight, with fibrous aluminum silicate, where used, between about 1.4–4.3% by dry weight.

It will be recognized that this invention is broadly directed to an improved ceramic composition for fired ceramic foams comprised of $Al_2O_3$ with additives of one or more of $ZrO_2$, $TiO_2$ or $MnO_2$. This invention is particularly directed to an improved ceramic composition for fired ceramic solids or foams comprised of $Al_2O_3$ with additives of $ZrO_2$ and one or both of $MnO_2$ and $TiO_2$, as well as the use of fibrous aluminum silicates for strengthening of the foam structures. Although the following detailed description will be largely devoted to one exemplary composition including additives of $ZrO_2$, $TiO_2$ and $MnO_2$, the breadth of this invention is not intended to be so limited, except as set forth in the claims hereinafter. For instance, it is within the contemplation of this invention to use hafnium oxide ($HfO_2$) instead of zirconium oxide, since hafnium oxide exhibits almost identical ceramic and chemical properties to those of zirconia in this composition. It is also anticipated that iron oxide ($Fe_2O_3$) may also be substituted as one of the minor additives, yielding the advantageous improved thermal shock and general thermal resistance of the fired ceramic composition, further, ceramic fibers other than the preferred fibrous aluminum silicate are presumed to be useful in improving the structural strength of the fired structures, such as zirconium fibers and carbon fibers.

In one preferred form of the composition of this invention, ingredients are added to the above described about 60–99.4% alumina in preferred amounts as about 11–15% calcium stabilized zirconia, and minor additives of up to about 0.5% combined dry ceramic weight of titanium oxide and of manganese oxide (for example, 0.2% of each). It is preferable that the zirconium oxide, titanium oxide and manganese oxide particles be of a particle size of about 3 microns or less average in order to be more readily dispersed throughout the composition batch, and to be in intimate contact with the high purity alumina prior to subsequent thermal diffusion interactions. Coarser sizes of the minor ingredients may be substituted, providing the mixture is comminuted, such as by high energy methods, as by ball-milling sufficiently to create average particle sizes in the range of about 3 microns or less, which is herein deemed sufficient to intimately mix the minor alloy ingredients with the alumina. It is further preferred that the titanium and manganese oxides are derived from chemical preparation processes without high temperature calcination in order to provide for particles which are soft, friable, and can be readily broken up and dispersed throughout the mixture, such as during the high energy milling step.

Once thoroughly mixed, the composition, either in powder form or with additives in minor amounts of organic binders, plasticizers or traces of moisture (water), can be press formed, slip cast, slurry cast, extruded or otherwise formed into solid shapes by any processes known to the ceramic and pharmacology state of the art. Such solid structures when dried are about 60% dense. The solid structures can be presintered to red heat in the range 1600°–2100° F. to a chalky state, and then machined into mechanical components, for example. Ceramic compositions of this present invention as solid shapes when fired to temperatures between about 2700°–3000° F. create strong thermal shock-resistant and thermalresistant components. Thermal diffusion interreaction (alloying) of the composition results from the firing process, as is evidenced by both dimensional shrinkage of the solid and by a color change. For example, it has been observed that solids shrank about 15% linearly in the firing process. The initial unfired solids were light grey in color, and when fired changed to a brown color, signifying interreaction.

The ceramic composition of this invention can also be applied as a paint-like slurry. For example, batch compositions were prepared of about 70–75% ceramic powders and 30–25% of water base rheological suspending agents, such as methylcellulose and polyvinal alcohols. Such batches were ball-milled to intimately mix the powders and suspending agents. Trace amounts of wetting and defoaming agents, such as ethanol, isopropyl alcohol, octanol and/or polyglycol were added in amounts ranging from about 0.035–0.7%. Citric acid was added as an ionizing agent in amounts of up to about 0.07%. Citric acid and other organic acids aid in defloculating, i.e., separating the particles by ion repulsion. The batch slurries prepared exhibited viscosities ranging from 45,000 to as high as 80,000 centipoises, with a preferred nominal value between 60,000 to 70,000 centipoises.

Such slurries can be applied as thin replication coatings on open cell organic structures, such as cotton gauze, hair or synthetic fiber mats, cellulosic, polyurethane or other organic foams. These ceramic slurry coatings can be applied by mechanical action much like paint is applied or as liquid plaster of paris is applied to cotton gauze for the preparation of splints for broken human members, or by other methods common to the state of the art, such as set forth in U.S. Pat. Nos. 3,962,081 and 3,893,917.

For purposes of description herein, a typical, conventional, open cell material which can be advantageously used for making a ceramic foam is a resilient open cell polyurethane foam. Such foams are manufactured by Scott Paper Company, Philadelphia, Pa., and are available in sizes which are readily shaped with sharp knives, scissors or by a moving hot wire. These polyurethane foams are supplied in a wide variety of cell sizes, with reticulated webs somewhat proportional to the cell sizes. The cell sizes may range from 0.010" average diameter to 0.12" or so. The cell sizes are sometimes described with a number signifying the average number of cells that are intercepted by a one inch straight line. For example, a 0.010" nominal pore size is equated to 100 pores per inch or 100 ppi. Conversely, a 0.12" nominal pore size is equated to 8 pores per inch or 8 ppi. The polyurethane foam is generally produced to about 5% of theoretical density with 95% porosity, most all of which is open pores. Generally, the foam urethane has contiguous porosity from cell-to-cell with only a very small amount of impermeable membrane type closed "windows". Such organic foams exhibit inherent characteristics of permeability, tortuosity, pressure drop, etc. These inherent characteristics are relatively consistent even when such structures are replicated in ceramics.

Impregnation of the polyurethane foam with the paint-like ceramic slurries, as by squeezing and manipulating such impregnated foams, to consistent residual levels results in near duplication of the foam, except that the web diameter is increased proportional to the thickness of the residual ceramic slurry coating. Foam plastic polyurethane components can be impregnated with such ceramic slurries singularly or as multiple quantities, depending upon the component size, overall bulk, and available equipment.

Following impregnation, the structures are dried at room temperature, or below 250° F., in a heated environment, such as an oven, lehr and the like. The organic binders toughen as the replicated ceramic-organics system dries, permitting the dried components to be handled and stored without damaging the replicated film and the bulk foam structure.

Such dried components are then placed in conventional high temperature furnaces which may be of the periodic or of the continuous type. The dried components are heated at a rate of 100°–700° per hour to temperatures of about 1500°–1600° F. The organic binders and the polyurethane foam initially oxidize, leaving a weak structure of ceramics in the original web and bulk-like foam. The weak ceramic structure is gradually exposed to temperatures increasing to about 2700°–3000° F. at a rate of about 300° per hour, and held at the maximum temperature for about one hour. A preferred maximum temperature is 2850°–2900° F.; lower temperatures require excessive time for maturation of the ceramic, and higher temperatures are more costly and damaging to the furnace systems. This high temperature firing sinters the ceramic composition, producing a ceramic foam having high temperature resistance and improved thermal shock properties, characteristics which are highly advantageous in the filtering of molten metals and alloys.

In accordance with the present invention, the specific features thereof will be more readily understandable from a consideration of the following illustrative examples. In this regard, it has been found necessary to attempt to quantify or rate the thermal shock characteristics of fired ceramic compositions in general. For instance, it is known that relative resistance to thermal shock is inversely proportional to the quantity of particles which are spalled from a ceramic surface exposed to flame. Another quantifying test is to subject such thermally shocked specimens to a subsequent compression test, and relate the loss of strength to that exhibited prior to thermal shock.

Further thermal shock parameters may be elicited by exposing a ceramic foam to a high temperature catalyzing atmosphere, to combustion gas burning, or to a stream of molten metal, and observing the ceramic foam's resistance to failure during the test. In addition, thermally shocked ceramic foams can also be evaluated for strength, friability, loss of material, and by microscopic analyses.

Several different parameters drawn from the above were used herein for empirically quantifying the shock resistance of a fired ceramic. These parameters were determined by (1) the relative number of cracks appearing in the fired ceramic by water quenching specimens from 1500° F., or (2) by the relative number of particles which spall from a propane flame-heated fired ceramic, or can be readily brushed from the flame-heated and then cooled ceramic surface, or (3) the relative change (loss) of compressive strength from propane flame thermal shocking a fired ceramic.

Compression strength (3) was determined by applying a pressure at an increasing rate onto a center section of any size form ceramic sample. For instance, a foam ceramic was placed on a ⅛" thick rubber pad of about 60 durameter in order to uniformly distribute the supported foam. A 1" diameter steel rod with a ⅛" rubber pad of the same diameter has pressed vertically downward along the rod axis onto the top center surface of the ceramic foam sample. The compressive penetrating resistance of the ceramic foam was measured in terms of pounds and by dividing by the area of the penetrating steel rod. The results were reported as pounds per size inch (psi).

A standard propane torch flame was used as a simple and effective laboratory method of thermal shocking ceramic foams to observe spalling (2). A 1½–2" flame, at a temperature estimated to be above 2700° F. and concentrated in a zone of ¾" in diameter, was operated at a constant setting throughout the testing of the ceramic foam. The flame, during the thermal shock cycle, was directed at the surface of the ceramic foam at a 45°–90° angle in order to observe the thermal shock action which may cause the fractured particles to spall, i.e., rapidly leave, or when cooled, to be readily brushed, leaving a cavity from the thermal shocked foam surface from the surface.

The flame tip was initially held about 6" away from the specimen for a time period of about one second, then brought to about 1½" from the ceramic to induce rapid convection heating. The flame was held at this location for a period of about five seconds. This caused the specimen to become incandescent under the flame. The flame and specimen were then separated to the 6"

spacing. This enabled the ceramic to rapidly cool below incandescence. The thermal cycle was then repeated.

For comparison purposes, a subjective scale was derived which rated the thermal shock (T.S.) characteristics of a fired ceramic tested according to (1)-(3) above on a scale of from 2-10, wherein 2 TS represents low thermal shock resistance and 10 TS represents high thermal shock resistance. This scale is given as follows:

| Comparable Results Of Thermal Shock Tests | | | |
|---|---|---|---|
| T.S. SCALE | SOLID CERAMIC CRACKING (CRACKS/INCH) | SPALLED OR LOOSENED PARTICLES | STRENGTH LOSS (% FROM UN-SHOCKED VALUE) |
| 10 T.S. | 0-3 | 0-10 | 0-30 |
| 8 T.S. | 4-8 | 10-20 | 30-40 |
| 6 T.S. | 10-20 | 20-50 | 40-50 |
| 4 T.S. | Breaks 2-3 pt. | Cavity formed | 50-80 |
| 2 T.S. | Explodes | Shatters | 80-100 |

In addition to the direct thermal shock tests given above, the following characteristics of the fired ceramic were also measured:

Abrasion resistance was determined by sand blasting the component with 2 kg of Ottawa sand at an air pressure level of 60 psi, onto the test specimen spaced 2" from a 0.190" diameter nozzle, where the resulting weight loss was measured to the closest milligram.

The relative density of the fired material was measured by weighing and measuring the resulting specimen, dividing the weight by the specimen volume, and then comparing the ratio of the porous ceramic to the theoretical value of a pore-free same composition; the values were reported as X% theoretical density.

TABLE A

| (Given in approximate weight % of Mixture of Example) | | | | | | |
|---|---|---|---|---|---|---|
| Example | I | II | III | IV | V | VI |
| Alumina (A) | 59.7 | 54. | 10.9 | 14.6 | 14.6 | 11.1 |
| Alumina (B) | — | — | 37.7 | 34.2 | 34.2 | 26.2 |
| Alumina (C) | — | — | 8.3 | 12.5 | 12.5 | 9.6 |
| Zirconia (D) | — | 6. | 10. | 8.3 | 8.3 | 25.2 |
| Titania (E) | 0.2 | — | .25 | .26 | .26 | .25 |
| Manganese Oxide (F) | .2 | — | .25 | .26 | .26 | .25 |
| Alumina Silicate (G) | — | — | 3. | 1. | 1. | — |
| Binder (H) | — | — | 18.5 | 20.5 | 20.5 | 18.1 |
| Water (I) | 39.9 | 40. | 11. | 8.4 | 8.4 | 8.4 |
| Ionizing Agent (J) | — | — | — | 0.07 | 0.07 | 0.1 |
| Wetting Agent (K) | — | — | — | 0.035 | 0.035 | 0.1 |
| Polyglycol (L) | — | — | 0.5 | — | — | 0.5 |
| Zirconyl Nitrate (M) | — | — | — | — | — | 0.3 |

TABLE B

| Code Material | Average Particle Size | Purity % | Detail |
|---|---|---|---|
| Aluminum Oxide (A) | 0.65 micron | 99.7 | Ball milled |
| Aluminum Oxide (B) | 1.4 micron | 99.7 | Ball milled |
| Aluminum Oxide (C) | 2.8 micron | 99.7 | Ball milled |
| Zirconium Oxide (D) | −325 mesh | 95 + Calcia | Fused Stabilized |
| Titanium Oxide (E) | −325 mesh | 99 | Rutile |
| Manganese Oxide (F) | −325 mesh | 99 | |
| Aluminum Silicate (G) | | 70% | Calcined Fibrous |
| Polyvinyl Alcohol | Solution | 13 | 100,000 |

TABLE B-continued

| Code Material | Average Particle Size | Purity % | Detail |
|---|---|---|---|
| in Water (H) | | | M.W. |
| Water (I) | Hot | Pure | Distilled |
| Citric Acid (J) | | 98 | |
| 1-Octonal (K) | | 98 | |

TABLE C

| Properties of Example Ceramics | | | | | | |
|---|---|---|---|---|---|---|
| Example | I | II | III | IV | V | VI |
| Structure | slug | slug | foam | foam | foam | foam |
| Ave. Compression Strength (un-shocked foam, psi) | | | 71 | 233 | 295 | 228 |
| Ave. Compression Strength (un-shocked foam, psi) | | | | 173 | 228 | 184 |
| T.S. Value | 9 | 5 | 10 | 10 | 10 | 10 |

Example I A 5,000 gram compositional batch according to Example I in Table A.

Step 1 - The batch was prepared of commercially obtainable materials principally including 3,000 grams of less than 1 micron particle size reactive (magnesia doped, dry ball milled) aluminum oxide of not less than 99.7% purity, and including 7.5 grams of −325 mesh titanium oxide and 7.5 grams of −325 mesh manganese oxide were blended with 2,000 grams of distilled water. No zirconia was used in this composition. The blend was ball-milled for three hours and became gelatinous, in that the particles remained in suspension.

Step 2 - The batch was oven dried overnight at 250° F. The dried batch was de-agglomerated by hand and pulverized by dry ball-milling. The dry powder batch was hydrostatically pressed to 10,000 pounds per square inch (psi) into cylindrical slugs.

Step 3 - The slugs were fired in a normal firing run at an average rate of about 350° F. per hour to 2,850° F. and held at the maximum temperature for one hour. These fired 99.3% pure alumina alloyed solid slugs had the following properties. They exhibited a 9 T.S. value for the water quench thermal shock test from 1,500° F. as compared with a 2 T.S. value for non-alloyed 99.8% pure aluminum oxide, that is, aluminum oxide not containing the trace (less than 0.5%) amounts of titanium and manganese oxides, which was similarly shocked. An abrasion test established that the fired 99.3% alloyed batch abraded about ten times more than that of the purer non-alloyed aluminum oxide fired under similar conditions. The firing also caused the light grey color to change to a brown color. These changes established that the composition interreaction had in fact occurred.

Although an improved thermal shock characteristic was demonstrated for this slug, the slug lacked the superior high temperature durability, better abrasion resistance, and generally superior strength of the ceramic compositions made in accordance with this invention containing zirconia as well as a micron additive of $TiO_2$ or $MnO_2$.

Example II A compositional batch according to Example II in Table A.

A batch was prepared of commercially available materials principally including 2,700 grams of less than 1. micron particle size low sodium aluminum oxide (99.7% purity) and including 300 grams of −325 mesh fused calcium stabilized zirconium oxide, and 2,000 grams of distilled water. No minor additives of manganese oxide or titania were included. The batch was processed as described in Example I. The pressed and fired composition was characterized as having the following properties. It exhibited a 5 T.S. thermal shock resistance and exhibited an erosion weight loss in a standard abrasion test of about twice that of the non-alloyed alumina. (This decrease in abrasion resistance is not a significant factor in filtering or catalyst applications of the fired ceramic, for example.) A color change from grey to brown also established that composition interreaction had in fact occurred.

Example III A 3,000 gram compositional batch according to Example III in Table A.

Step 1 - A powder batch was prepared of commercially available materials and principally included 1,709 grams of +99% pure low sodium aluminas of three particle sizes. The alumina was mixed with 90 grams of calcined fibrous aluminum-silicate containing about 66% alumina and 33% silica, and the balance of the alumina was added. To this combination was added 300 grams of zirconium oxide.

A liquid batch composition consisted of 330 grams of hot distilled water, 555 grams of 13% polyvinyl alcohol solution, and 0.5% polyglycol (film stabilizer) were blended together for five minutes, and in which were dispersed the minor ingredients of titanium oxide and manganese oxide. The powder batch was gradually blended into the liquid batch in order to prevent the formation of massive plastic agglomerates that would otherwise be difficult to integrate. The combined batch was then ball-milled for a period of three hours to create an intimate mixture of the powder and liquid ingredients, and to break down any agglomerates. The ball-milled combined batch slurry exhibited a viscosity and texture like paint.

Step 2 - The slurry was impregnated into 0.55" by 0.85" by 2.28" rectangles of 30 ppi Scott polyurethane foam with a weight pickup of five grams. The ceramic impregnated foam specimens were air dried overnight at room temperature.

Step 3 - The dried specimens were then fired to 2,925° F. at a rate of about 350° F. per hour, and held at that temperature for 1½ hours. These fired ceramic foam specimens had the following properties. They exhibited 6.4% of theoretical density (i.e., 93.6% porosity), a 71 psi average compression strength before thermal shock, and a thermal shock value of 10 T.S.

Example IV A 38,000 gram compositional batch according to Example IV in Table A.

Step 1 - A powder batch was prepared of commercially available materials principally including 23,418 grams of +99% pure low sodium aluminas of three particle sizes (alumina A was Alcoa A-16 powder alumina). To the batch was added 300 grams of fused stabilized zirconium oxide in a particle size less than 42 microns. A liquid batch composition consisted of 3,196 grams of hot distilled water, 7,832 grams of 13% polyvinyl alcohol solution, 26.5 grams of citric acid and 13.3 grams of octal alcohol (1 - Octonal) as wetting agent.

To this liquid batch were added 99 grams of titanium oxide, 99 grams of manganese oxide, both chemically prepared and of a particle size of less than about 42 microns, and 382 grams calcined alumina silicate (75% alumina, 25% silicon) fiber. The solid batch was gradually added to the liquid batch while stirring.

The mixture was ball-milled for 4½ hours. The resulting slurry exhibited a viscosity of 62,000 centipoises, a pH of 7.6, a slurry density of 2.23 grams per cubic centimeter.

Step 2 - The slurry was impregnated into 20 ppi Scott polyurethane foam components in amounts sufficient to provide fired specimens exhibiting densities of about 10.5% of theoretical value with about 13% linear shrinkage. The impregnated foam was air dried for four days.

Step 3 - The dried structures were then fired in a gas heated kiln. The heating rate from ambient to about 1500° F. was at a rate of about 600° F. per hour, and from about 1,500°–2,850° F. at a rate of about 300° F. per hour. The structures were held at about 2,850° F. for one hour.

The fired ceramic foams of this example exhibited the following properties. An average compressive strength was recorded as 233 psi for the non-thermal shocked foams. Following thermal shock, an average compressive strength of 173 psi, was recorded, or only a 25.2% loss in strength, for a 10 T.S. value.

Example V A 38,000 gram compositional batch according to Example V in Table A.

Step 1 - The batch was prepared and compounded as in the process of Example IV (alumina A was Reynolds 172 DBM powder alumina). The resulting mixture yielded a viscosity of 68,500 centipoises, a slurry density of 2.31 grams/cc, and a pH of 7.5.

Step 2 - The slurry was impregnated into 10 ppi Scott polyurethane foam, in the same manner as in Example IV.

Step 3 - The dried specimens were then fired in a gas heated kiln. The specimens were heated at an average rate of 500° F. per hour to about 1,500° F., and at a rate of 337° F. per hour to about 2,930° F., and held above 2,820° F. for one hour.

The fired ceramic foams were characterized by the following properties. Actual linear shrinkage was 12%. Average density was 9.6%, with an average compressive strength of 295 psi. Following thermal shock exposure, average compressive strengths of 228 psi were recorded, a strength reduction of only 22.7% for a 10 T.S. value.

Other specimens were prepared of 20 ppi Scott polyurethane foam according to this Example V. Except for pore size, the second group was processed identically to those of the first group. The resulting specimens showed linear shrinkage of 12% and an 8.4% density, with an average compression strength of 315 psi. Following thermal shock, an average compressive strength of 277 psi was recorded, a strength reduction of only 11.4% for a 10 T. S. value.

Example VI A 38,000 gram compositional batch according to Example VI in Table A.

Step 1 - A powder batch was prepared of commercially available materials principally including 27,734 grams of +99% pure low sodium aluminas of three particle sizes. To the powder batch was added 9,565 grams of fused stabilized zirconium oxide in a particle size less than 42 microns. A liquid batch composition consisted of 3,188 grams of hot distilled water, 6,886 grams of 13% polyvinyl alcohol solution, 38.3 grams of citric acid, 38.3 grams of polyglycol as a film stabilizer, and 114.8 grams of zirconium nitrate as a fixative. To this liquid batch was added 96 grams of titanium oxide, and 96 grams of manganese oxide, both chemically prepared and of particle size of less than about 42 microns.

The combined powder and liquid batches were ball milled for 3½ hours. The resulting slurry exhibited a viscosity of 77,000 centipoise, a pH of 7, and a liquid density of 2.59 grams per cubic centimeters.

Step 2 - The slurry was impregnated into 10 ppi Scott polyurethane foam components in amounts sufficient to provide fired specimens exhibiting densities of about 9% of theoretical.

Step 3 - Following drying in air for 3 days, the components were fired as described in Step 3 of Example V.

The fired foams were characterized by the following properties. Actual linear shrinkage was 13%. The average density was 9% with an average compressive strength of 228 psi before thermal shocking. Following thermal shock exposure, an average compressive strength of 184 psi was recorded, a strength reduction of only 19.3%, for a 10 T.S. value. Such ceramic foams were found effective in filtering molten 316 stainless steel in an industrial foundry.

What is claimed is:

1. A high temperature resistant, thermal shock resistant ceramic foam filter having the following composition by dry ceramic weight: 50–99.3% $Al_2O_3$ as a principal ingredient; about 5–35% $ZrO_2$ as a first additive; and about 0.25–0.5% of a combined dry weight of $TiO_2$ as a second additive and $MnO_2$ as a third additive.

2. The ceramic foam filter of claim 1 further including about 0.1–5% fibrous aluminum silicate in its composition as a structural strengthening material.

3. A thermal shock resistant ceramic foam filter having an open cell structure of interconnected voids surrounded by a, web of ceramic, and being comprised of the following:
   a principal ingredient of about 40–99.3% $Al_2O_3$; and a first additive of about 5–35% $ZrO_2$, and about 0.25–5% combined dry weight of $TiO_2$ as a second additive and $MnO_2$ as a third additive.

4. A thermal shock resistant ceramic foam filter having an open cell structure of interconnected voids surrounded by a web of ceramic and being comprised of the following:
   a principal ingredient of 60–99.3% $Al_2O_3$; a first additive of about 5–35% $ZrO_2$; and about 0.25–5% combined dry weight at $TiO_2$ as a second additive and $MnO_2$ as a third additive.

5. The ceramic foam filter of claim 4 further including about 0.1–5% fibrous aluminum silicate.

* * * * *

UNITED STATES PATENT AND TRADEMARK OFFICE
CERTIFICATE OF CORRECTION

PATENT NO. : 4,839,049
DATED : June 13, 1989
INVENTOR(S) : John W. Kinney, Jr., & John W. Graham It is certified that error appears in the above-identified patent and that said Letters Patent is hereby corrected as shown below:

Column 8, Line 64 "1½" should be -- 1-½ --

Column 11, Line 53 "1½" should be -- 1-½ --

Signed and Sealed this

Twenty-fourth Day of October, 1989

Attest:

DONALD J. QUIGG

*Attesting Officer*  *Commissioner of Patents and Trademarks*